(12) United States Patent
DesJardien et al.

(10) Patent No.: US 9,889,610 B2
(45) Date of Patent: Feb. 13, 2018

(54) AUTOMATED PLY FORMING AND COMPACTION USING FLEXIBLE ROLLER CONTACT

(71) Applicant: The Boeing Company, Chicago, IL (US)

(72) Inventors: Matthew R. DesJardien, Kenmore, WA (US); James N. Buttrick, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 328 days.

(21) Appl. No.: 14/446,082

(22) Filed: Jul. 29, 2014

(65) Prior Publication Data

US 2016/0031166 A1    Feb. 4, 2016

(51) Int. Cl.
| | | |
|---|---|---|
| B29C 70/42 | (2006.01) | |
| B29C 70/30 | (2006.01) | |
| B29C 70/50 | (2006.01) | |
| B29L 31/30 | (2006.01) | |
| B29C 53/04 | (2006.01) | |
| B29C 70/54 | (2006.01) | |
| B29C 70/34 | (2006.01) | |

(52) U.S. Cl.
CPC ............ B29C 70/30 (2013.01); B29C 70/504 (2013.01); *B29C 53/043* (2013.01); *B29C 70/34* (2013.01); *B29C 70/42* (2013.01); *B29C 70/54* (2013.01); *B29L 2031/3076* (2013.01)

(58) Field of Classification Search
CPC ....... B29C 53/02; B29C 53/04; B29C 53/043; B29C 70/34; B29C 70/42; B29C 70/504; B29C 70/54
USPC ........................................................ 425/374
See application file for complete search history.

(56) References Cited

U.S. PATENT DOCUMENTS

| | | | | |
|---|---|---|---|---|
| 3,009,201 | A * | 11/1961 | Hansen ................. | B29C 53/043 |
| | | | | 156/486 |
| 4,351,688 | A * | 9/1982 | Weiss ...................... | B26D 5/04 |
| | | | | 156/358 |
| 4,475,976 | A | 10/1984 | Mittelstadt et al. | |
| 4,818,460 | A * | 4/1989 | Nied ..................... | B29C 51/082 |
| | | | | 264/310 |
| 5,314,563 | A * | 5/1994 | Grimshaw ............ | B29C 70/388 |
| | | | | 156/358 |
| 5,352,306 | A | 10/1994 | Grimshaw et al. | |
| 6,814,916 | B2 | 11/2004 | Willden et al. | |
| 7,527,759 | B2 | 5/2009 | Lee et al. | |
| 8,333,864 | B2 | 12/2012 | Brennan et al. | |
| 9,248,591 | B2 * | 2/2016 | Caffiau ................... | B29C 70/38 |
| 9,314,974 | B2 * | 4/2016 | Buttrick ................. | B29C 69/00 |
| 2010/0024971 | A1 | 2/2010 | Benson et al. | |
| 2010/0178454 | A1* | 7/2010 | Brufau Redondo .. | B29C 53/043 |
| | | | | 428/119 |
| 2012/0006475 | A1 | 1/2012 | Colombo et al. | |
| 2014/0065354 | A1 | 3/2014 | Smith, Jr. et al. | |

* cited by examiner

*Primary Examiner* — James Mackey
(74) *Attorney, Agent, or Firm* — Yee & Associates, P.C.

(57) ABSTRACT

A composite ply is compacted around a radius edge of the tool by a rolling former that rolls over the radiused edge and conforms to any contours along the length of the edge. The rolling former includes a compliant tubular member rotatably held in spaced apart roller assemblies.

20 Claims, 18 Drawing Sheets

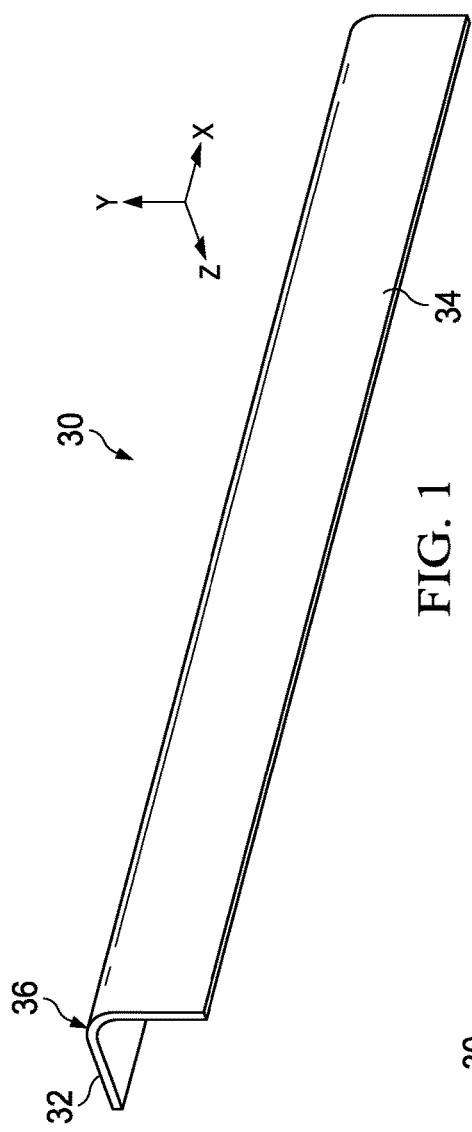
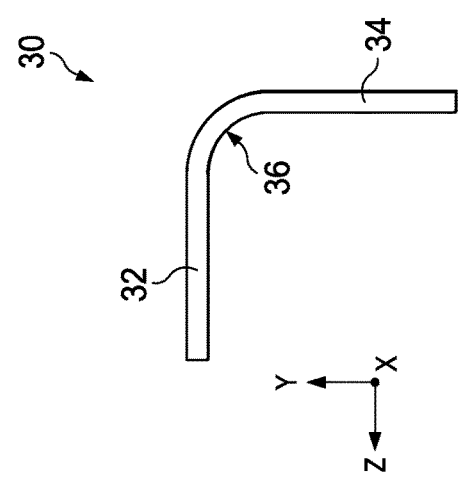

AUTOMATED PLY FORMING AND COMPACTION USING FLEXIBLE ROLLER CONTACT

BACKGROUND INFORMATION

1. Field

The present disclosure generally relates to fabrication of composite laminate structures, and deals more particularly with a method and apparatus for compacting composite plies over contoured surfaces.

2. Background

During the fabrication of composite laminate structures, it is sometimes necessary to form and compact composite plies over highly contoured tools. For example, in order to fabricate blade type stringers used the aircraft industry, plies may be formed and compacted over a 90° outside radius on a tool.

Several techniques have been used in the past to form and compact plies over contoured tools, but each has disadvantages. Hand-layup and sweeping the plies is possible, but is slow, labor intensive, non-calibrated and may be inaccurate and/or unreliable. Plies may also be laid up and compacted using automated composite tape laying machines which use an integral roller to compact the tape, however these machines are expensive and may not apply even pressure over the width of the tape. Vacuum bags may be employed to compact composite plies over contoured tools, however difficulties may be encountered in achieving even compaction pressure over all areas of the ply. Automated ply sweeping machines have been proposed that use nosepieces to sweep plies over the part profile. However, ply sweeping machines require the use of an intermediate material, such as a low friction sheet between the nosepiece and the ply to prevent distortion and/or smearing of reinforcing fibers caused by the sweeping motion. Installation of the sheet adds to processing time and labor. Moreover, the intermediate material is a consumable item that increases production costs.

Accordingly, there is a need for a method and apparatus for compacting composite plies on contoured tools that avoid the need for ply sweeping, and which are capable of applying uniform compaction pressures. There is also a need for a method and apparatus of the type mentioned above that are capable of maintaining application of a long, uninterrupted line contact compaction force over a contoured tool area.

SUMMARY

The disclosed embodiments provide a method and apparatus for compacting composite plies over tools that may include local or continuous contoured areas, such as an inside or outside radius. Compaction pressure is applied to the plies using a flexible, compliant tube that is rolled over the ply, including around a tool radius or other contours. The rolling motion of the tube avoids fiber damage to the ply, and the compliant, flexible properties of the tube assure uniform, constant compaction pressure is applied to the ply over extended lengths. The flexible, compliant properties of the tube over its entire length allows the tube to conform to and apply even compaction pressure to the ply in area of localized tool contours.

According to one disclosed embodiment, a method is provided of compacting a composite ply on a tool. The ply is contacted with a tubular member which is then rolled over the ply. A compaction force is applied to the tubular member as the tubular member is rolling over the ply. Rolling the tubular member includes holding the tubular member within a set of rollers, and rotating the tubular member within the set of rollers. Applying a compaction force includes applying pressure to the tubular member at each of a plurality of locations along a length of the tubular member. The tool may include local contours, and rolling the tubular member includes flexing the tubular member along its length to conform to the local contours of the tool. The tool may include a contoured edge, and rolling the tubular member includes rolling the tubular member over and around the contoured edge of the tool substantially throughout the length of the tubular member. Rolling the tubular member includes contacting the tubular member with a set of rollers, rotating the tubular member within the set of rollers, and rotating the set of rollers around the contoured edge of the tool. The contoured edge has a length and is curved along its length, and the method further includes complying the tubular member to the contoured edge substantially throughout the entire length of the contoured edge.

According to another disclosed embodiment, apparatus is provided for compacting a composite on a tool. The apparatus comprises a tubular member capable of rolling over and applying compaction pressure to the ply, and a plurality of former assemblies located along the tubular member for the rolling the tubular member over the ply. The tubular member is flexible and is capable of complying to any curvature of the tool. Each of the former assemblies includes first and second roller assemblies arranged side-by-side along the tubular member. The tubular member is rotatably held within each of the first and second roller assemblies. Each of the former assemblies further includes a compaction cylinder coupled with the first and second roller assemblies for applying a compaction force to the tubular member. Each of the former assemblies also includes a gimbal mounting arrangement pivotally mounting each of the first and second roller assemblies. The gimbal mounting arrangement includes a pivotable spreader rocker having first and second ends, and the first and second roller assemblies are respectively pivotally mounted on the first and second ends of the spreader rocker. The former assemblies are pivotally connected with each other. The apparatus may further comprise a plurality of rail assemblies including guide tracks for respectively guiding movement of the former assemblies. The former assemblies are respectively mounted for guided movement along the guide tracks. The apparatus may also include a pair of laterally spaced apart support beams, wherein the rail assemblies are spaced apart from each other and are mounted on the support beams, and a base slidably mounted on the support beams capable of supporting the tool.

According to still another embodiment, apparatus is provided for compacting a composite ply on a compaction tool. The apparatus comprises a plurality of rollers and a roller holder for holding the rollers in spaced apart relationship to each other. The apparatus also includes a tubular member rotatably held between the rollers and capable of rolling over the ply, and a force applicator coupled with the roller holder for applying a compaction force to the tubular member. The apparatus further comprises a gimbal mounting arrangement for mounting the roller holder to pivot around first and second axes. The force applicator includes a cylinder having a linearly displaceable cylinder rod coupled with the roller holder.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a blade-type composite laminate stringer.

FIG. 2 is an illustration of an end view of the stringer shown in FIG. 1.

DETAILED DESCRIPTION

Referring first to FIGS. 1 and 2, the disclosed embodiments relate to a method and apparatus for fabricating a composite laminate structure such as a stringer 30 used in aircraft or other applications. The stringer 30 comprises a base flange 32 and a flat blade integrally joined together by a radius 36. The stringer 30 is fabricated by laying up, forming and compacting a plurality of plies (not shown) of fiber reinforced resin such as, without limitation a CFRP (carbon fiber reinforced plastic). In the illustrated example, the stringer 30, including the radius 36 is substantially straight along its length (X-axis), however in some applications, the stringer 30 may include one or more curves, contours or undulations along its length. The stringer 30 is merely illustrative of a wide range of composite laminate stiffeners that may be fabricated using the method and apparatus described below.

Figure 3:
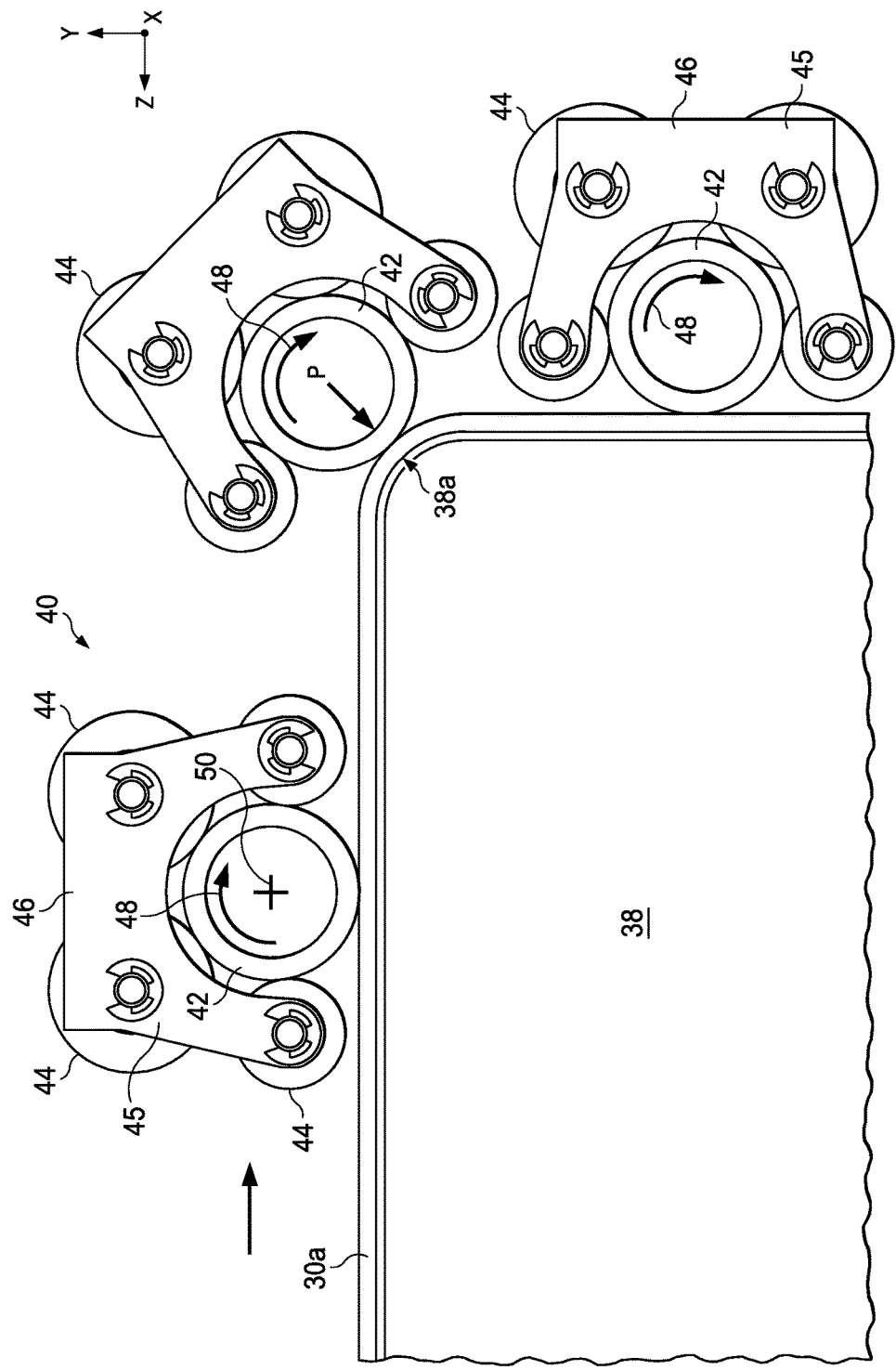
FIG. 3 is an illustration of an end view of a composite ply being compacted against an outside radius of a tool by a rolling former.

Referring now to FIG. 3, one or more plies 30a are placed a suitable compaction tool 38, sometimes also referred to herein as a tool block 38. The plies 30a may be flat or may be pre-formed to the desired shape before being placed on the tool block 38. The tool block 38 includes a radius edge 38a that substantially matches the inside of the radius 36 of the stringer shown in FIGS. 1 and 2. As will be discussed below in more detail, the ply 30a, including the radius edge 36a of the ply 30a is compacted against the tool 38 using a rolling technique that employs a rolling former 40 to apply the desired compaction pressure "P" against the ply 30a. Although not shown in figures, the apparatus may include one or more load cells for sensing the compaction pressure being applied to the plies 30a by the rolling former 40 and generating signals that may be used to adjust the compaction pressure being applied along the length of the tool block 38.

The rolling former 40 comprises a rolling tube 42 having a substantially circular cross-sectional, self-retaining shape that extends substantially along the entire length of the ply 30a. The rolling former 40 provides unified rolling line contact between the tube 42 and the ply 30a throughout the length of the radius edge 36a. This unified rolling line contact between the tube 42 and the ply 30a is maintained along the entire length of the tube 42 as it roll over flat and well as localized or continuous tool surfaces. The rolling former 40 reduces the total reaction forces as well as slipping or scrubbing at the point of contact with the ply 30a, and provides simultaneous forming over the entire length of the radius edge 38a. Where the ply 30a is flat when placed on the tool block 38, the rolling former 40 may be used to both form and compact the plies 30a on the tool block 38. For convenience in this description, the terms "compaction" and "compacting" shall include the use of the rolling former 40 to form a ply 30a to shape and/or compact the ply 30a.

The tube 42 may be formed of any suitable material such as an acrylic or other plastic, or a foam that is flexible or semi-flexible and/or compliant. In the illustrated embodiment, the tube 42 is hollow and open at its ends, however, in other embodiments the tube 42 may be formed of a solid compliant material, or may comprise a closed inflatable tube that is pressurized to achieve a desired degree of compliancy. Where the tube 42 is hollow and is formed of a flexible or semi-flexible material, the degree of flexibility and compliance may be established at least in part by the wall thickness of the tube 42. The degree of the tube flexibility and/or compliancy will vary with the application, but generally the tube 42 will be sufficiently flexible and compliant allow it to conform to any local or continuous curves, contours, undulations or similar variations in the tool that may be present. In some applications, the compliancy of the tube 42 may depend at least in part on the hardness of the tube surface that engages the plies 30a.

In some embodiments, the tube 42 may comprise a composite material, such as without limitation, a plastic that is overwrapped with a layer of "non-stick" material such as Teflon® film. In other embodiments, the tube 42 may comprise a core formed of a suitable material surrounded by a jacket formed of another material that tunes the performance of the tube 42 to suit a particular application. In one application of the disclosed embodiments that was used to compact a stringer 30 such as that shown in FIGS. 1 and 2 having ⅛ inch radius edge 38a, a tube 42 having a diameter of approximately 1 inch provided desired compaction results. The diameter of the tube 42 may vary with the application, and may depend on the type and size of surface features of the tool block 38. The use of a tube 42 having a larger outside diameter may be desirable in some applications because a wider tube diameter provides a wider contact area between the tube 42 and the ply 30a, with shallower lead-ins lead-outs. A tube 42 having a larger outside diameter may be better suited to compact plies 30a over local steps or angles on the tool block 38 without the need to tilt the rolling former 40. The use of a tube 42 having a smaller outside diameter may be better suited to applications where the tool block 38 has sharper features such as a small inside radius.

The rolling former 40 further comprises a plurality of roller assemblies 45, each comprising a roller holder 46 and a plurality of rollers 44 mounted for rotation on a roller holder 46. The roller holder 46 holds the rollers 44 in spaced apart relationship to each other such that the rollers 44 are circumferentially arranged to partially surround the tube 42. The rollers 44 extend beyond the center 50 of the tube 42, forming an "over-center" mounting arrangement of the rollers 44. This over-center mounting arrangement results in the tube 42 being captured and rotatably held between the rollers 44. The rollers 44 allow the tube 42 to turn 48 as it rolls over and applies compaction pressure "P" to the ply 30a. The tube 42 may be removed from the rollers 44 by longitudinally sliding the tube 42, allowing the tube 42 to be changed, replaced or altered to suit the requirements of a particular application.

Figure 4:
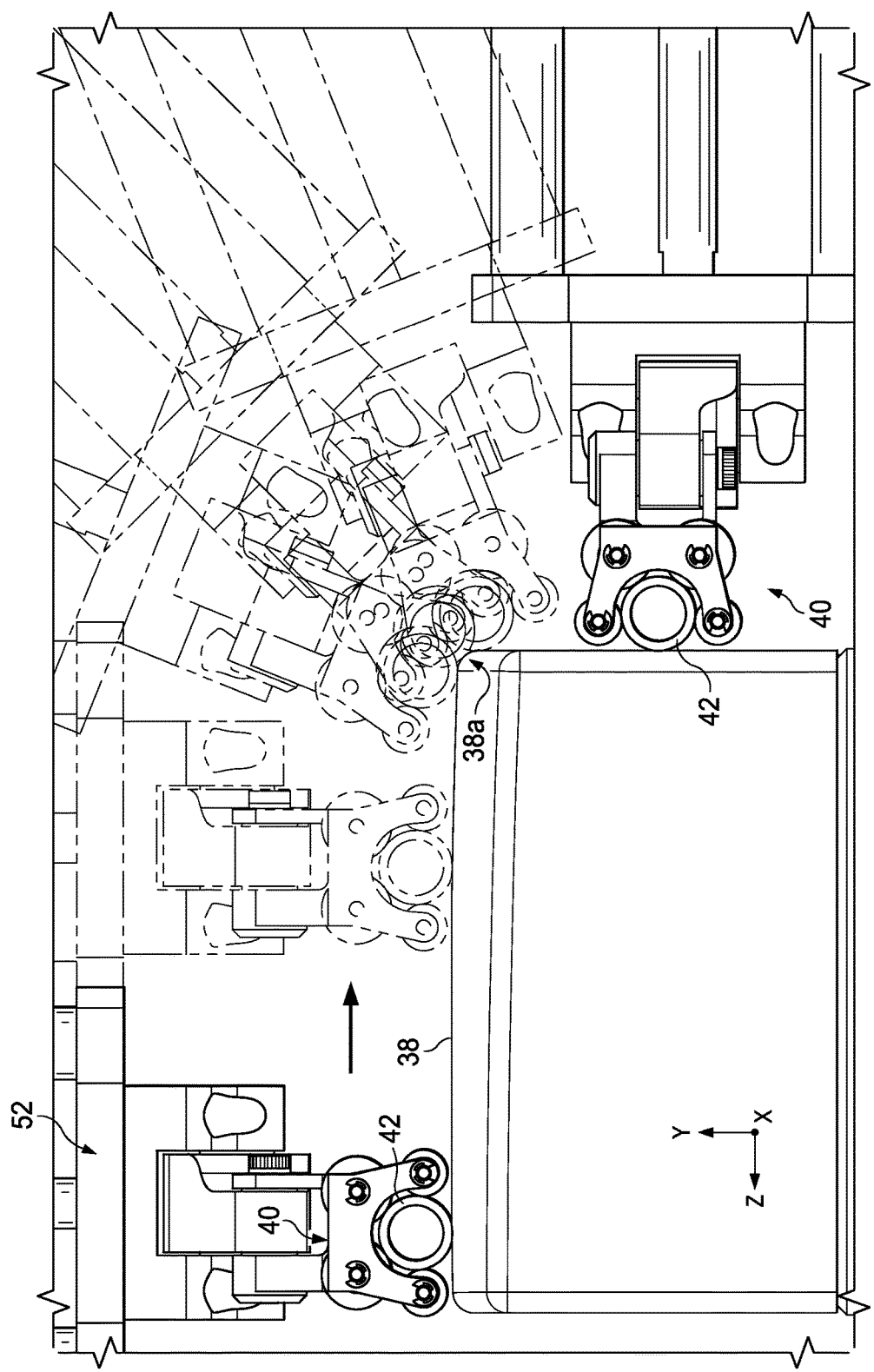
FIG. 4 is an illustration of an end view similar to FIG. 3, but showing successive positions of the rolling former during the ply compaction process.
Figure 5:
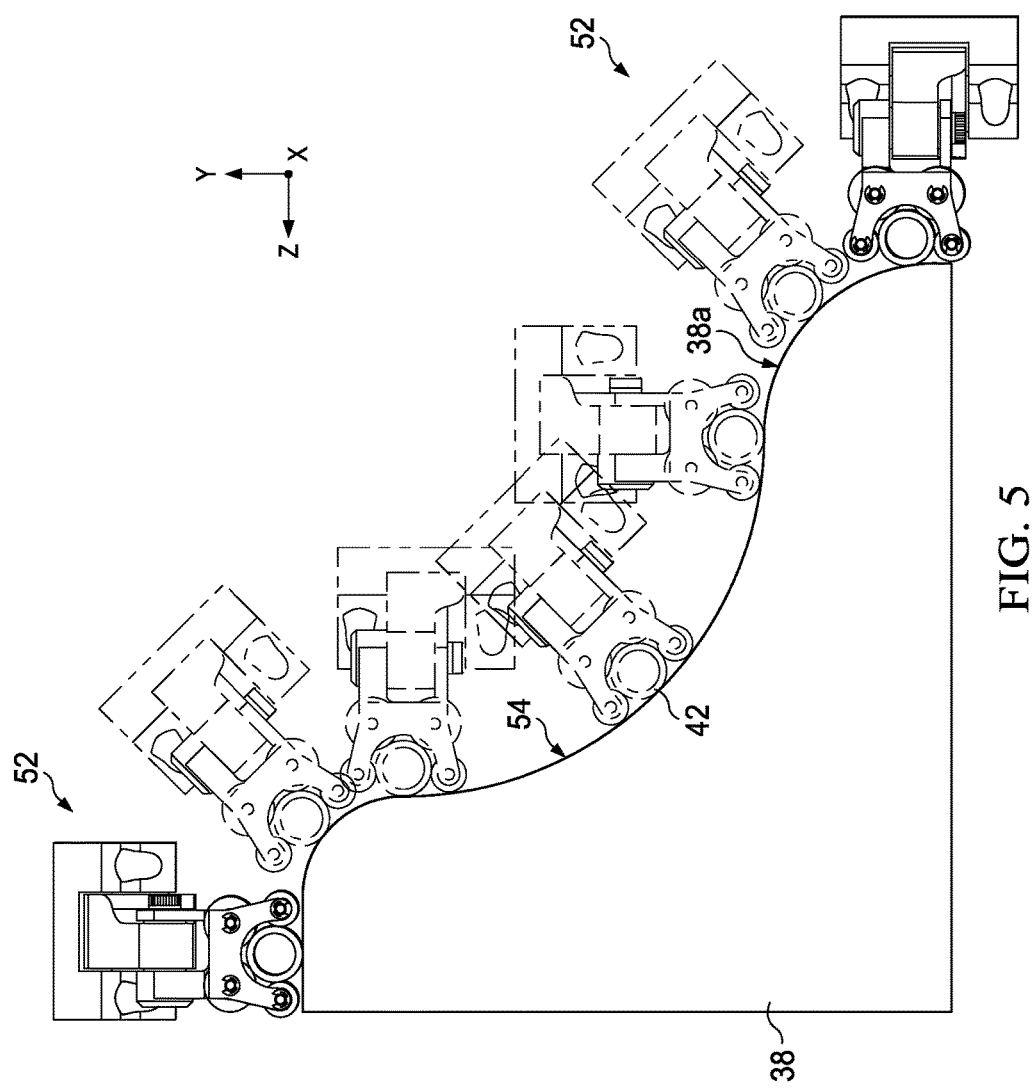
FIG. 5 is an illustration of an end view showing successive positions of the rolling former moving over the surface of a compaction tool having both the inner and outer radius surfaces.

Referring to FIG. 4, the rolling former 40 forms part of later discussed end-effectors, hereinafter referred to as forming assemblies 52, which extend along the length of the tool block 38 and control the coordinated motion of the rolling former 40, as well as the amount of compaction pressure that is applied through the tube 42 to the ply 30a. The former assemblies 52 control the motion of the rolling former 40 over various curves, contours and undulations along the length of the tool block 38. In FIG. 4, the rolling former 40 traverses around an outside radius 38a on the tool block 38. However, FIG. 5 illustrates the ability of the former assemblies 52 to move the rolling former 40 over both an internal radius surface 54 (concave surface), and an external radius surface 38a (convex surface).

Figure 6:
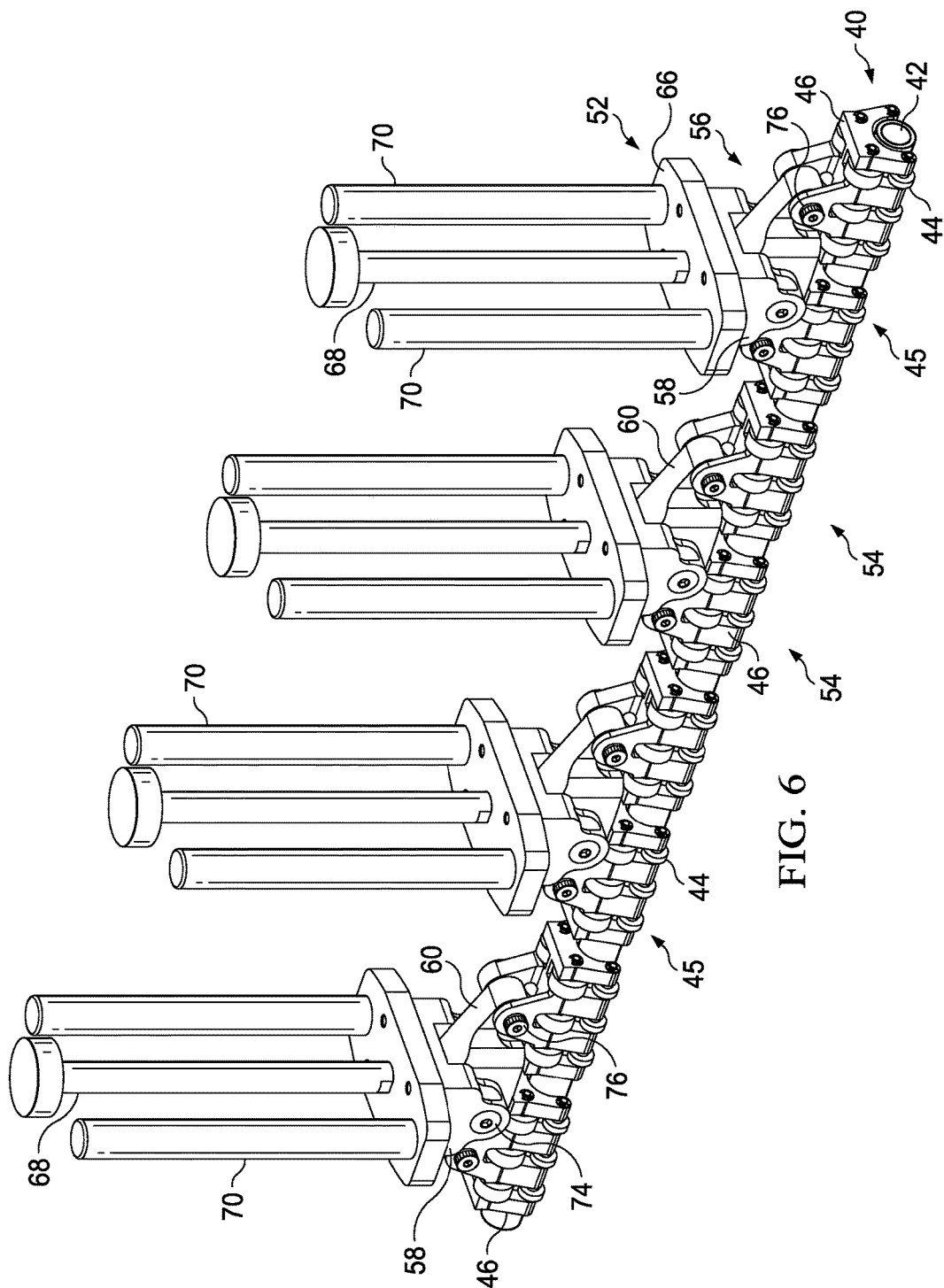
FIG. 6 is an illustration of a perspective view showing a plurality of former assemblies for applying compaction pressure to a rolling compaction tube.

Attention is now directed to FIGS. 6-9 which show additional details of the former assemblies 52. As best seen in FIG. 6, multiple former assemblies 52 are located along the length of the tube 42, effectively segmenting the compaction force applied to the tube 42. This segmenting of the applied compaction force allows different sections of the tube 42 to more fully conform and comply with local areas of contoured surfaces of the tool 38, such as, but not limited to the radius edge 38a. The former assemblies 52 may be slightly spaced apart from each other along the length of the tube 42 a distance that may vary with the application, and the degree of flexibility and compliance of the tube 42.

Figure 7:
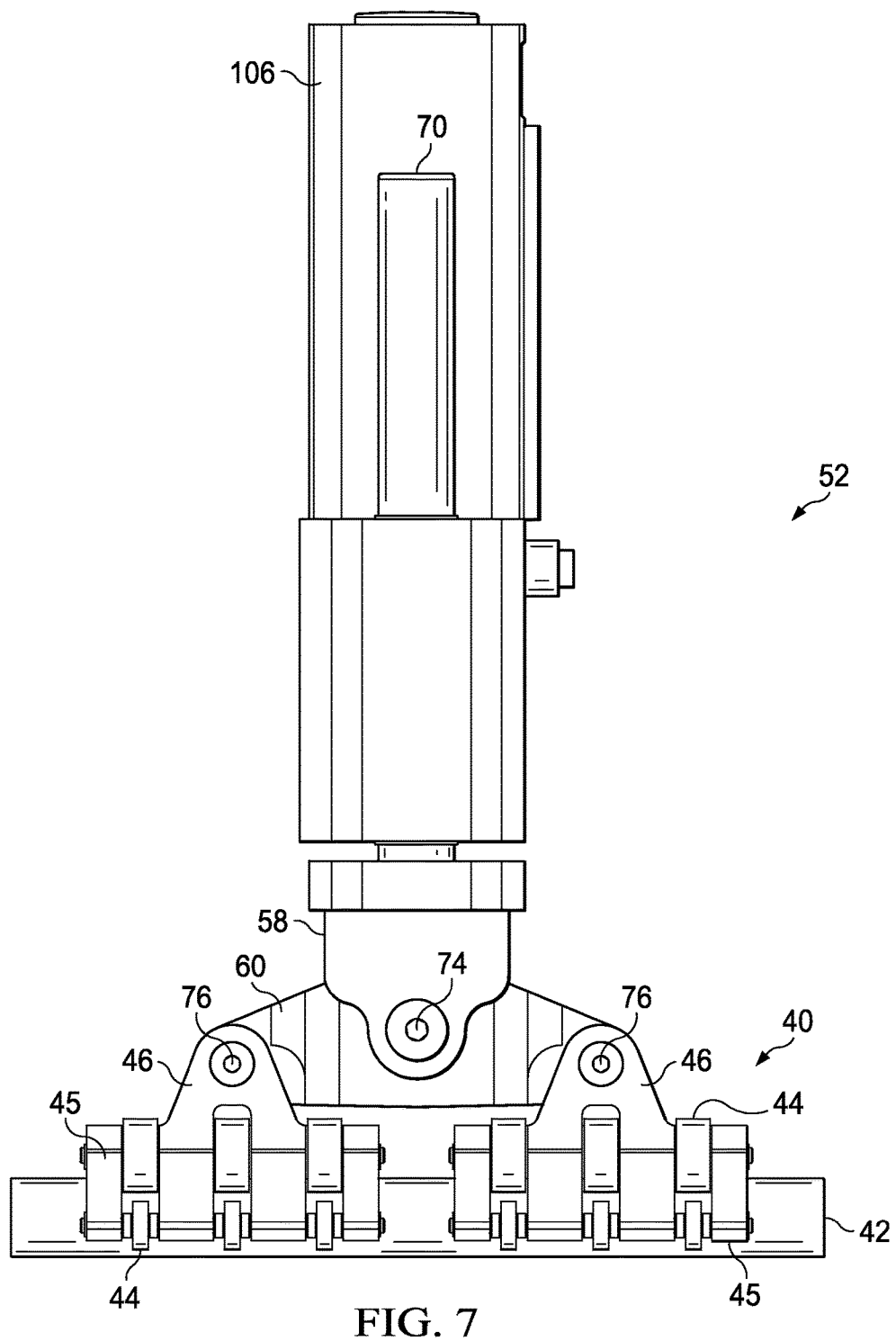
FIG. 7 is an illustration of an isometric view of one of the former assemblies.
Figure 8:
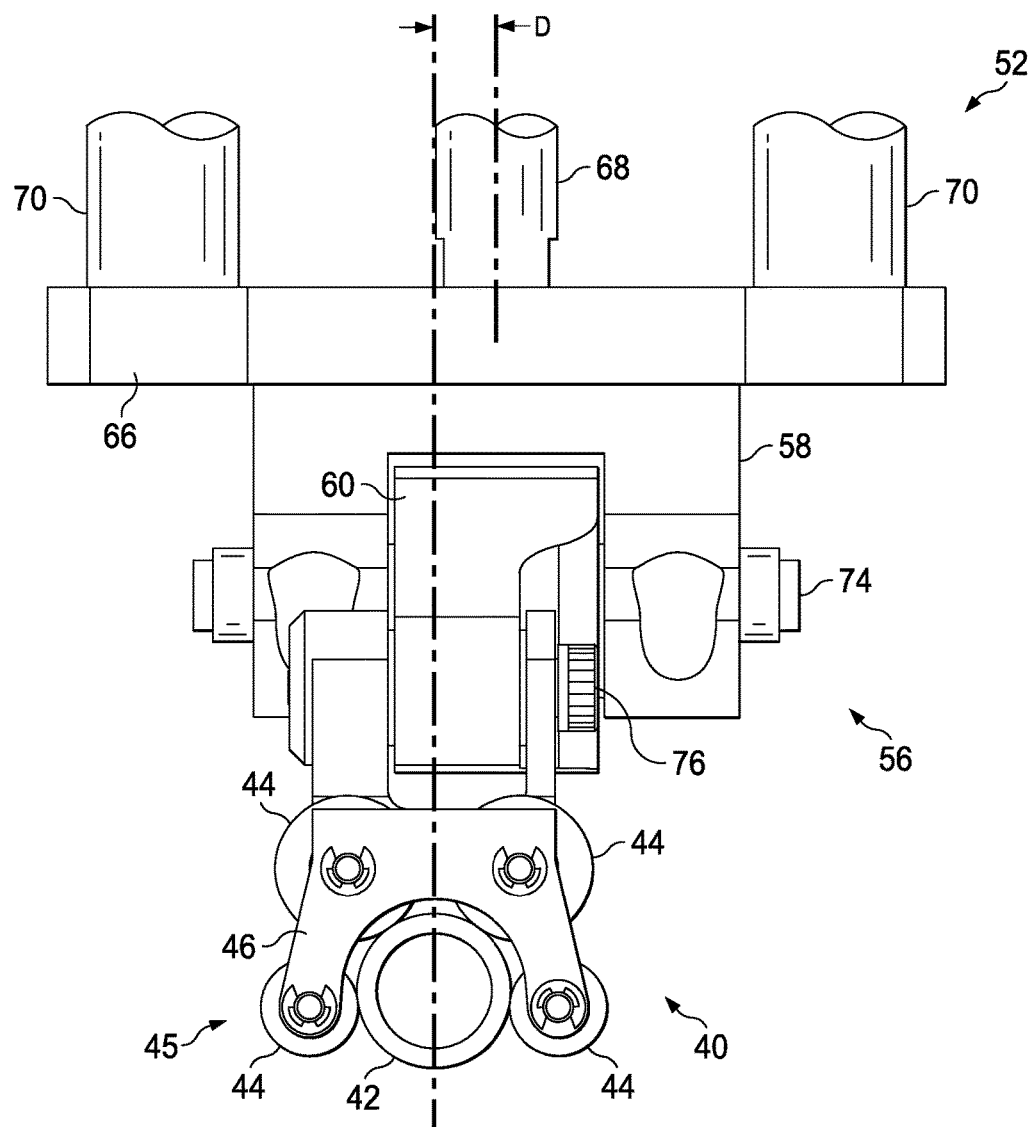
FIG. 8 is an illustration of an end view of the lower portion of the former assembly shown in FIG. 7.
Figure 9:
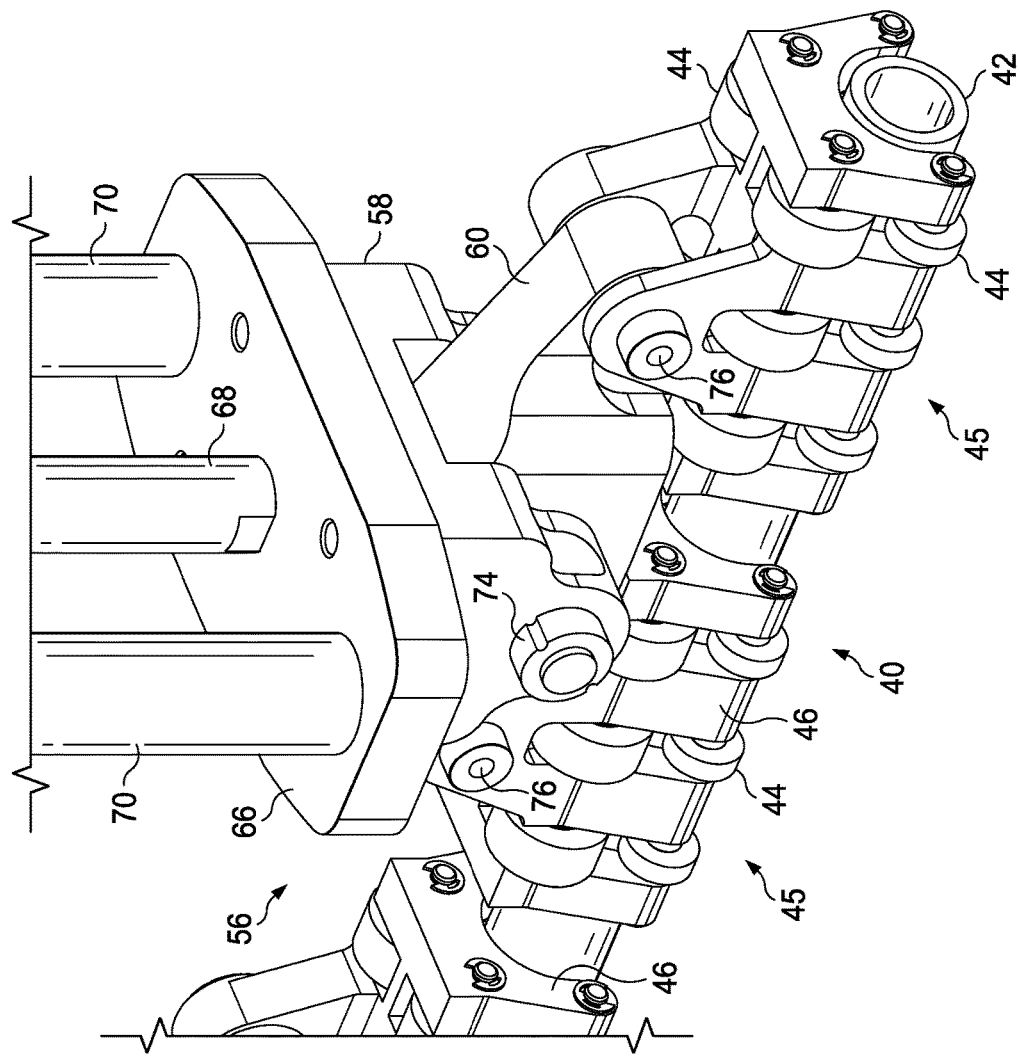
FIG. 9 is an illustration of a perspective view of one of the lower portion of one of the former assemblies.

In the illustrated example, the former assemblies 52 control pairs of the roller assemblies 45 and apply a compaction force to the tube 42 at different locations along the length of the tube 42. As best seen in FIGS. 7, 8 and 9, the roller holders 46 are pivotally mounted by pivot pins 76 on opposite ends of a pivotable spreader rocker 60. The spreader rocker 60, in turn is pivotally mounted by a pivot pin 74 on a gimbal body 58. Thus, the pivotal connections provided by pivot pins 74, 76 form a gimbal mounting arrangement of the roller assemblies 45, allowing the roller assemblies 45 to pivot about two separate axes, and thereby independently conform the tube 42 to local areas of the radius edge 38a or other surface contours on the tool 38.

As shown in FIG. 7, a cylinder mounting plate 66 is attached to the gimbal body 58 to allow mounting of a drive mechanism which may be in the form of a compaction cylinder 106 that applies a compaction force that is transmitted by the linearly displaceable cylinder rod 68 through gimbal body 58 to the roller assemblies 45. The compaction cylinder 106 may adjust the applied compaction force to suit local contours of the tool 38. The compaction cylinder 106 may be pneumatically or hydraulically powered, or alternatively, replaced with a force limited servo actuator, a pneumatically or hydraulically driven screw drive or similar drive mechanism. The use of a compliant rolling tube 42 in combination with compaction cylinders 106 results in a form of passive compliance of the rolling former 40 that permits application of compaction force without prior knowledge of the tool surface, thereby reducing programming and part database management. The cylinder rod 68 forming part of the compaction cylinder 106 is secured to the cylinder mounting plate 66, along with two spaced apart guide rods 70 (see FIG. 9) that guide the movement of the former assemblies 52, as will be discussed later in more detail.

As shown in FIG. 8, the central axis of the cylinder rod 68 is laterally offset a distance "D" from the centerline of the tube 42. As a result of this offset distance, the axis of the applied compaction force is slightly forward (in the direction of travel) of the center of the tube 42. This offset between the axis of the applied compaction force and the rolling center of the tube 42 decouples vertical change from rotational change which, in some applications, facilitates translation from the contoured horizontal surface to a flat vertical surface around a curved tool edge.

Figure 10:
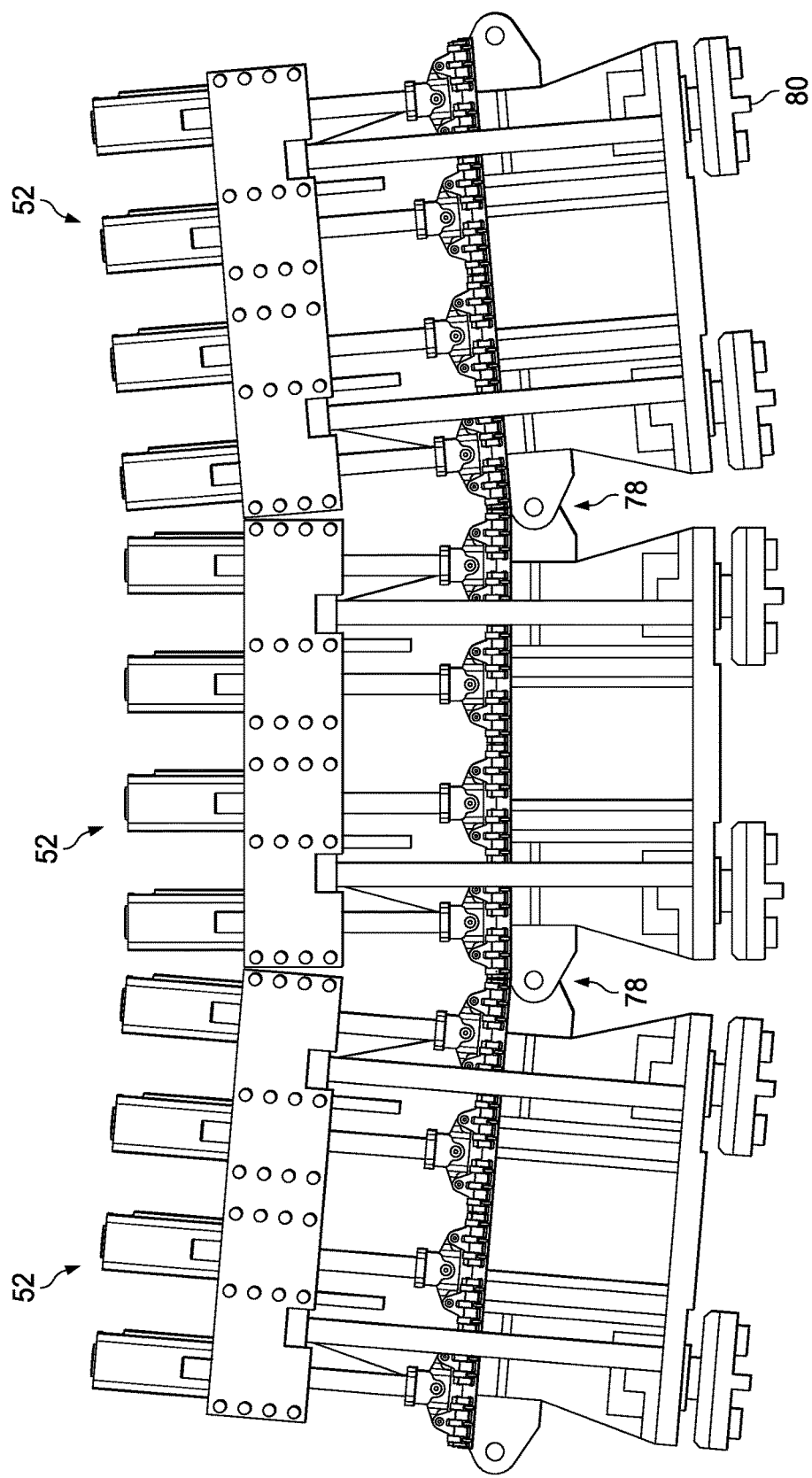
FIG. 10 is an illustration of a front elevational view showing how a plurality of articulated former assemblies conform to a concave contour along the length of the compaction tool.
Figure 11:
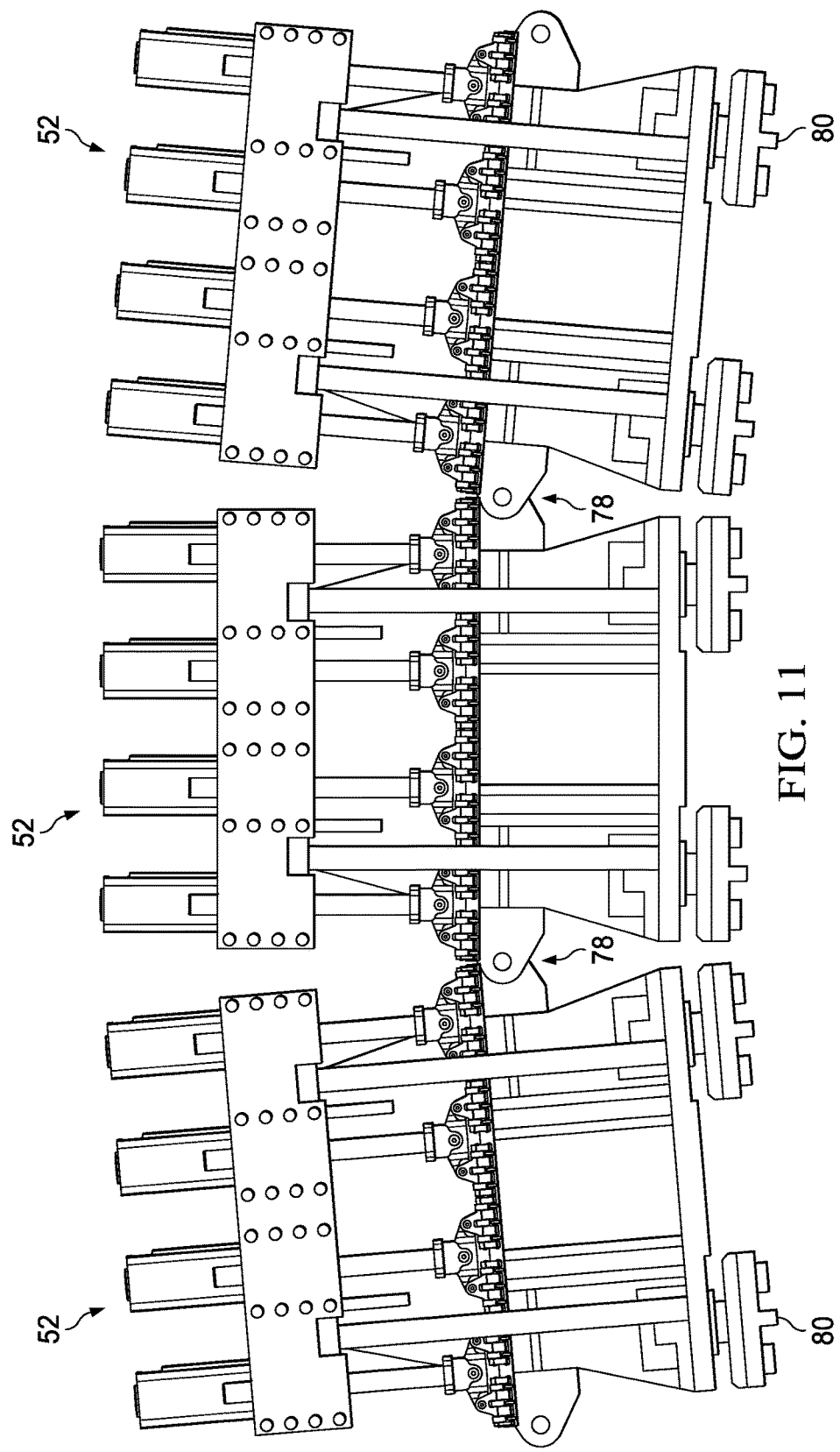
FIG. 11 is an illustration of a front elevational view showing how a plurality of articulated former modules conform to a convex contour along the length of a compaction tool.
Figure 12:
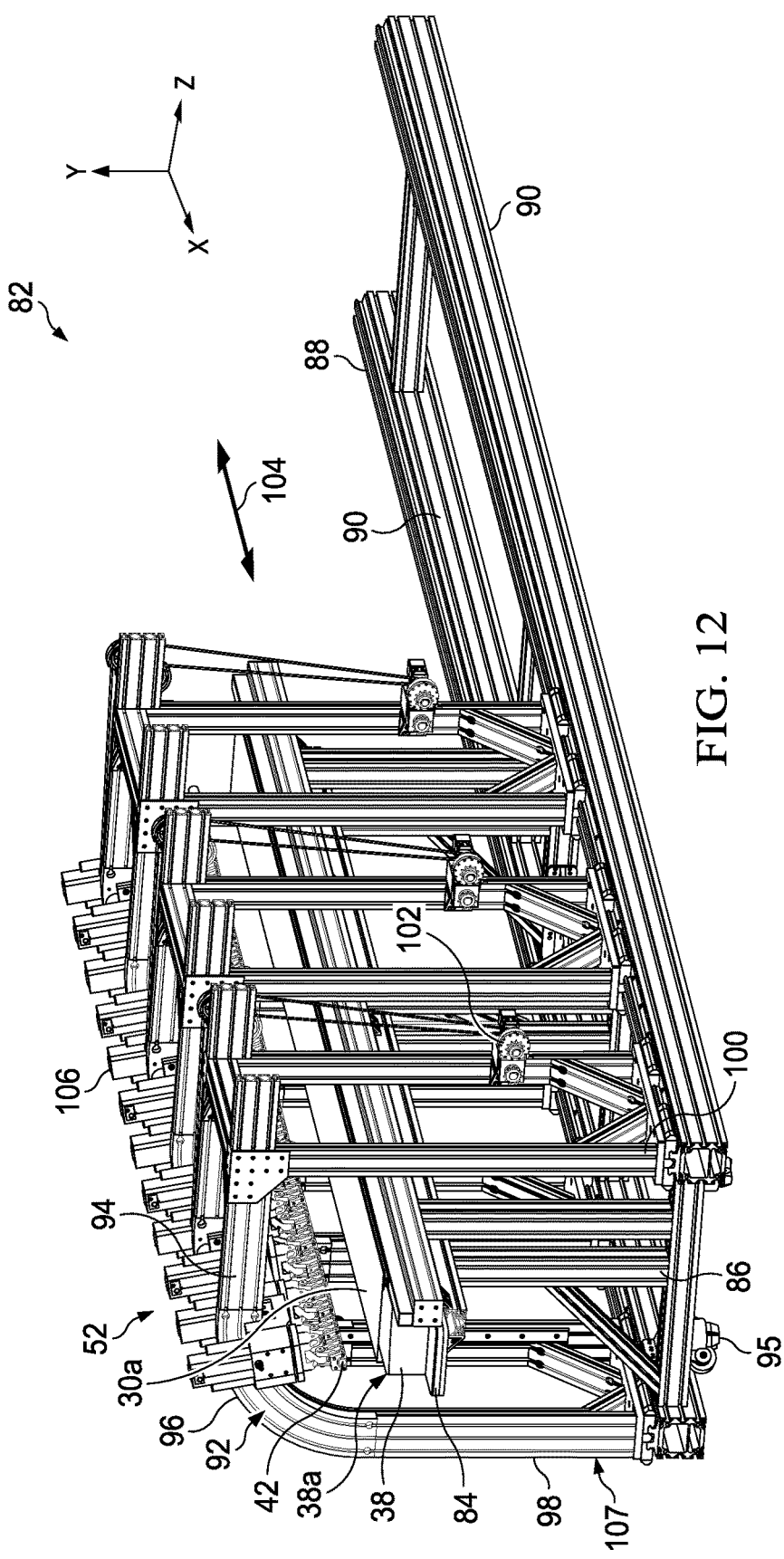
FIG. 12 is an illustration of a rear perspective view of apparatus for compacting a composite ply over a contoured edge of the tool, groups of the former assemblies shown in a raised, starting position.
Figure 13:
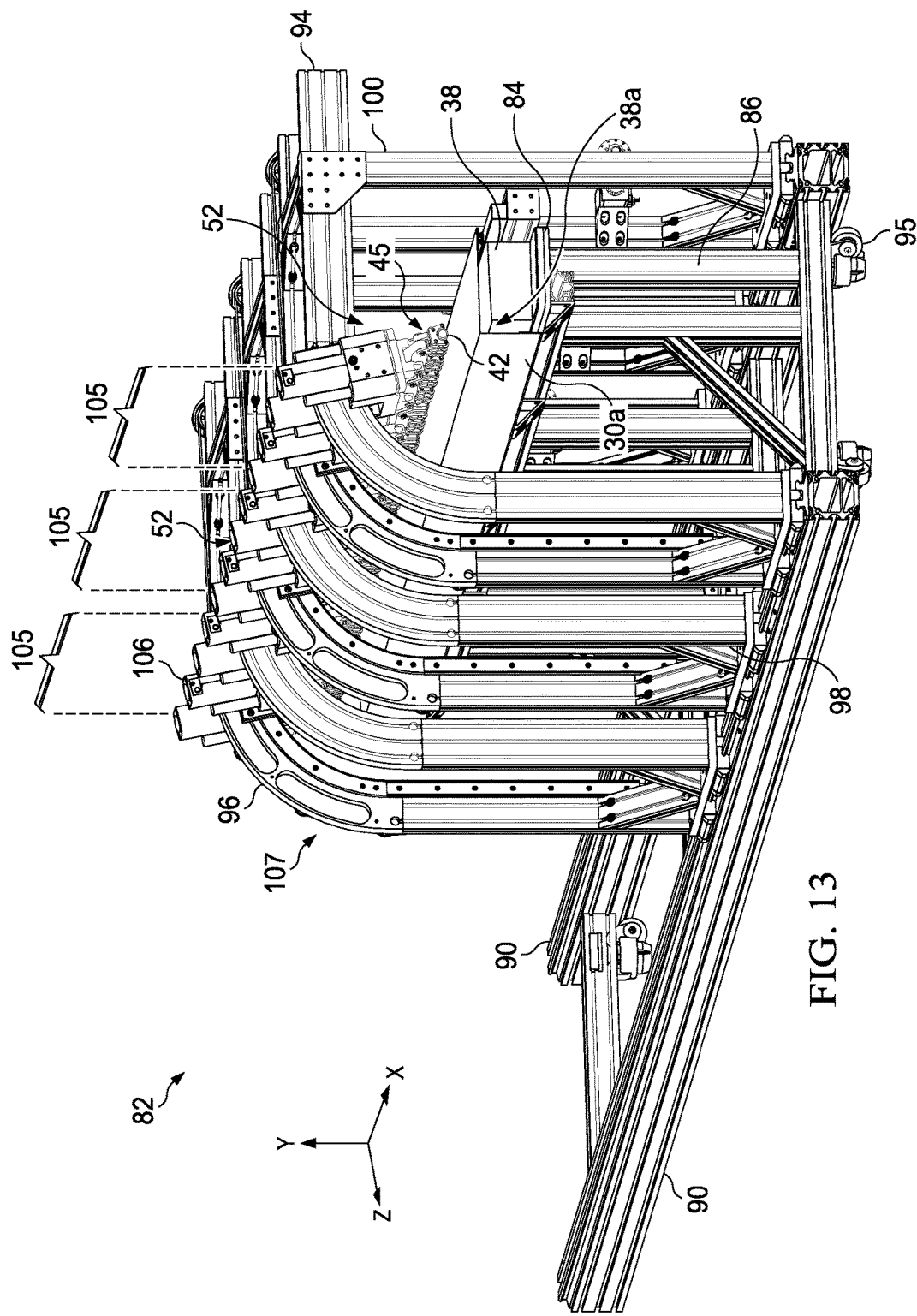
FIG. 13 is an illustration of a front perspective view of the apparatus shown in FIG. 12.
Figure 14:
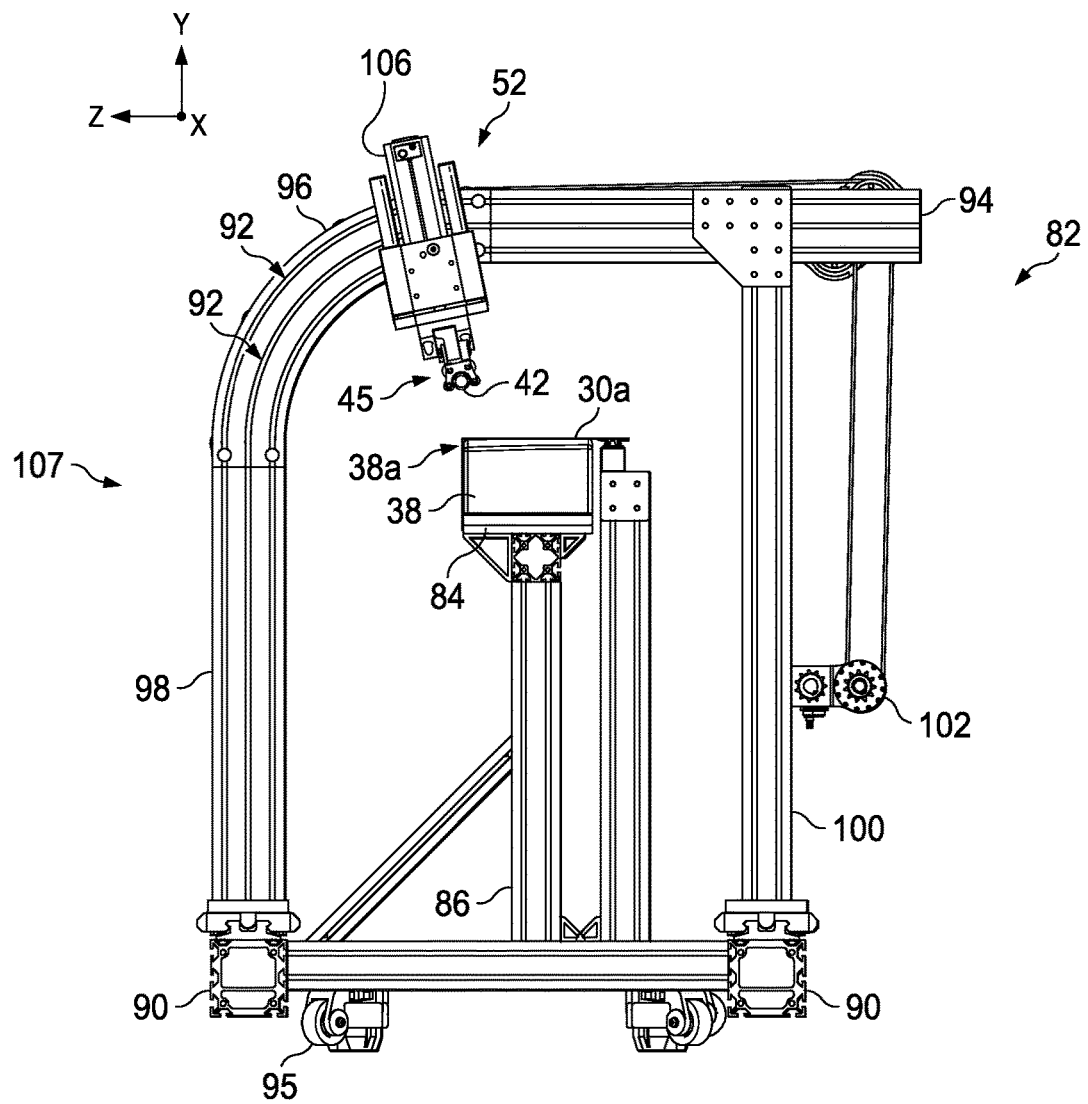
FIG. 14 is an illustration of a perspective view of the right side of the apparatus shown in FIG. 12.
Figure 15:
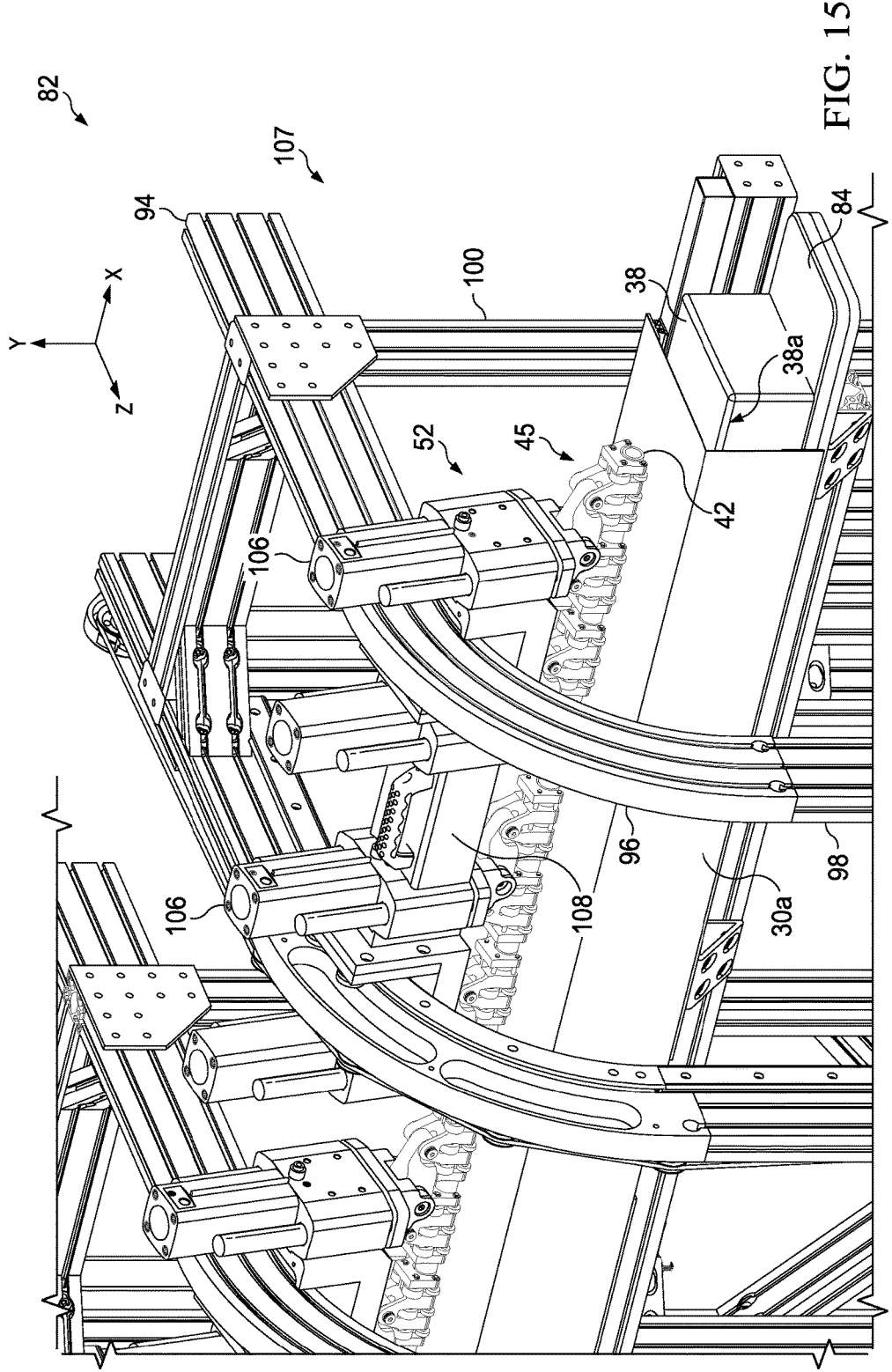
FIG. 15 is an illustration of a front perspective view of the apparatus of FIG. 13, enlarged to better show the position of the former assemblies relative to a compaction tool.
Figure 16:
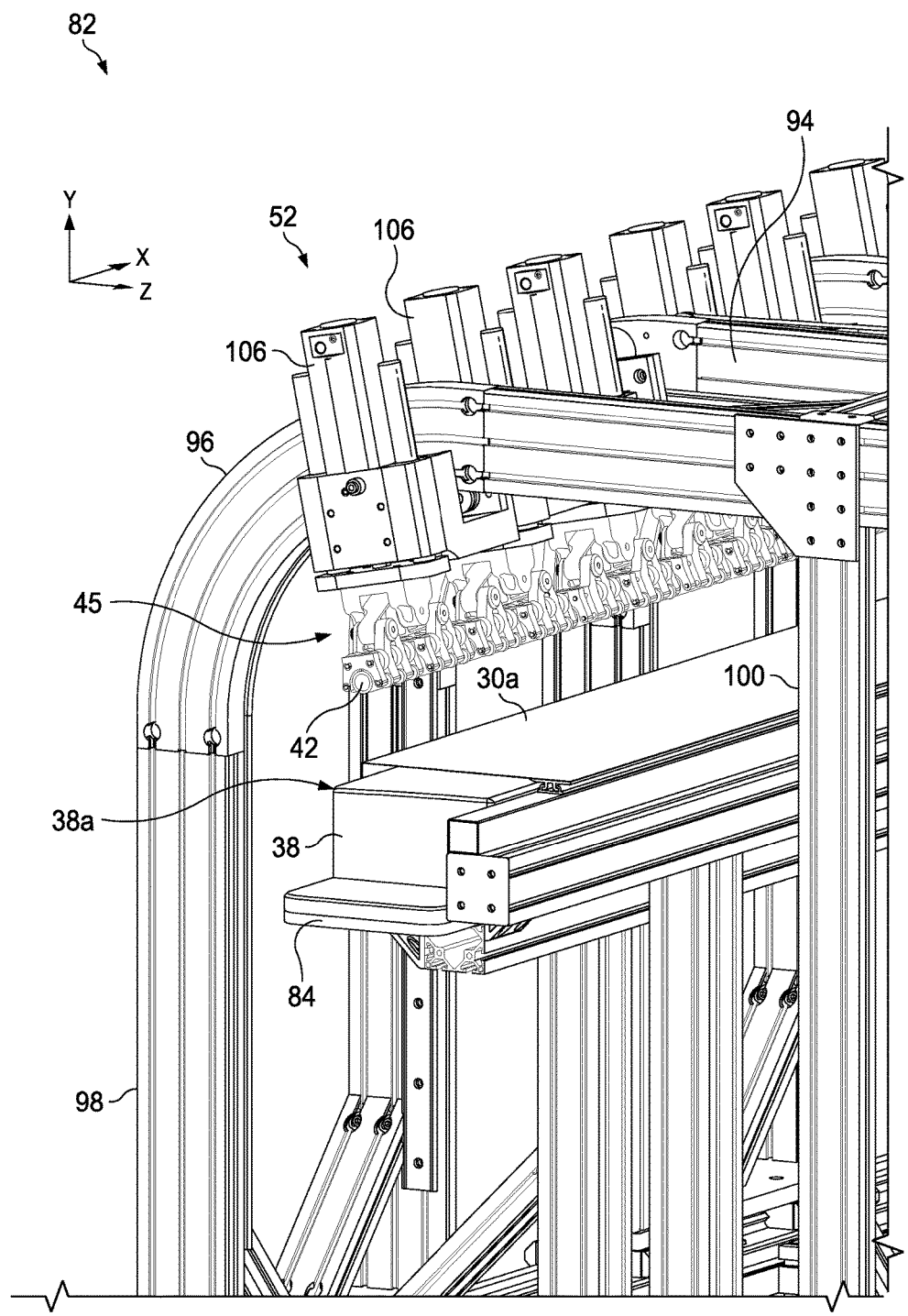
FIG. 16 is an illustration similar to FIG. 15 but viewed from the rear of the apparatus.
Figure 17:
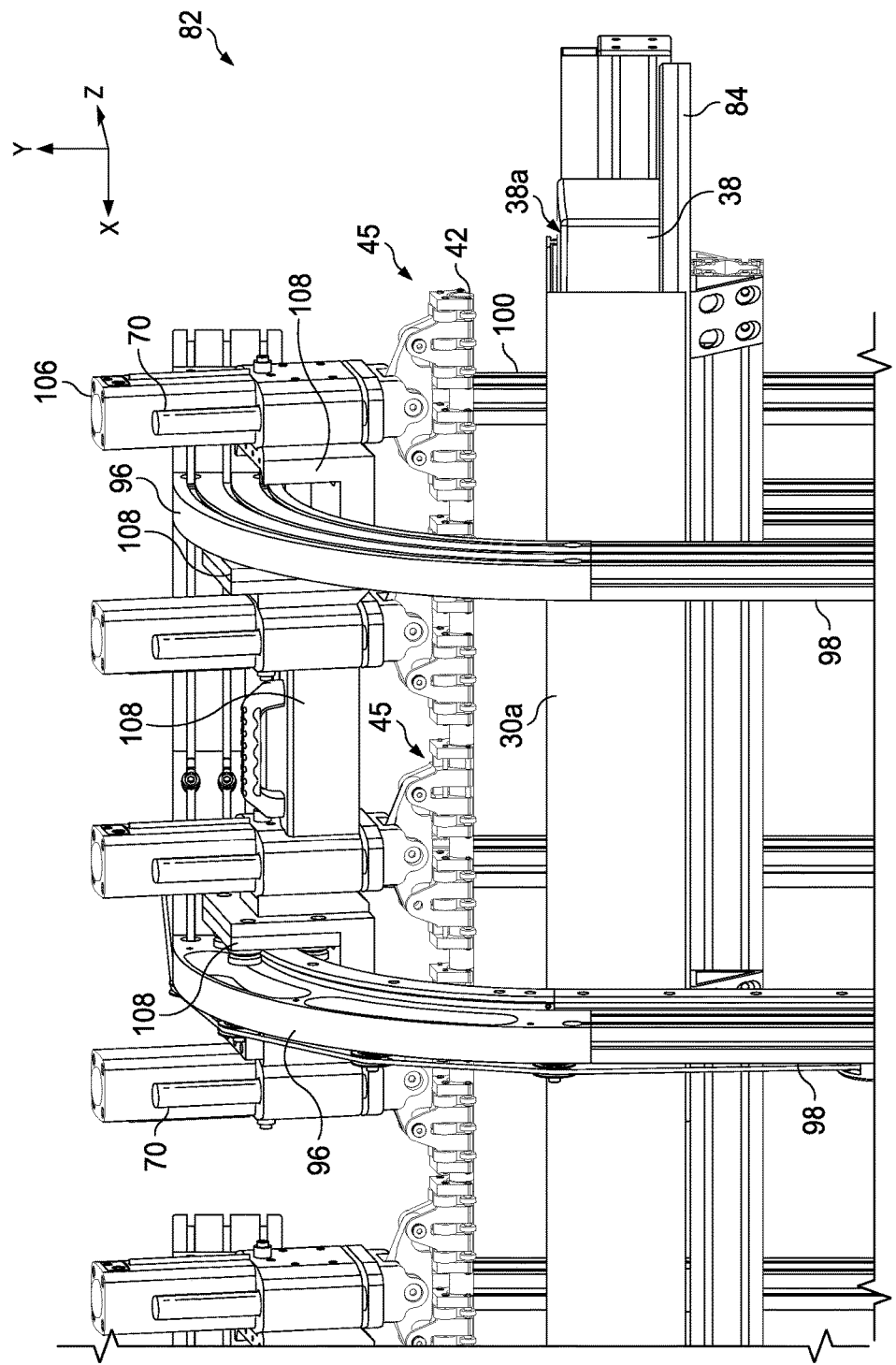
FIG. 17 is an illustration of a perspective view of one group of the former assemblies of the apparatus shown in FIGS. 12-16.

Referring now to FIGS. 10 and 11, the use of multiple, independent former assemblies 52 allows the tube 42 to better conform to curves, contours and/or undulations along the length (X-axis) of the radius edge 38a. For example, in FIG. 10, it can be seen that the former assemblies 52 collectively conform to a concave shape, while the former assemblies 52 shown in FIG. 11 collectively conform to a convex shape. In some applications, it may be desirable to provide pivotal connections 78 between the former assemblies 52. The pivotal connections 78 may allow compaction loads to be transmitted between the former assemblies 52 in order to apply a more even compaction force to the tube 42 along its length.

Attention is now directed to FIGS. 12-17 which illustrate an apparatus 82 for compacting forming and composite plies over contoured edges using a plurality of the former assemblies 52 which include the roller assemblies 45 previously described. A form block 38 having a radius edge 38a is supported on a base plate 84. The base plate 84 is mounted on a base frame 86 which is slidable 104 (FIG. 12) along track rails 88 carried on a pair of laterally spaced apart support beams 90. Mounting the base plate 84 on the track rails 88 allows the form block 38 to be translated from a ply loading position (not shown) to an operative position (see FIGS. 12 and 13) in which the ply 30a may be compacted against the form block 38 using a plurality of the former assemblies 52.

In the illustrated embodiment, three groups 105 (see FIG. 13) of the forming assemblies 52 are used to apply compaction a compaction force to the tube 42 while simultaneously rolling the tube 42 around the radius edge 38a. Each group 105 comprises four of the forming assemblies 52 mounted brackets 108 (FIG. 15) that are fixed to the compaction cylinders 106. In other embodiments, the apparatus 82 may have more or less than three groups of the forming assemblies 52, and each group 105 may have more or less than four forming assemblies 52. The forming assemblies 52 are modular and may be added or removed to suit the application, and the length of the particular tool block 38 that is employed.

Each group 105 of the forming assemblies 52 is supported on a pair of fixed rail assemblies 107. Each of the rail assemblies 107 comprises a top rail 94, a curved rail 96 and a side rail 98. Each of the rail assemblies 107 is supported on one end thereof by a backside frame 100. Each of the rail assemblies 107 includes a pair of tracks 92 (see FIG. 14) in which a group 105 of the forming assemblies 52 is mounted, as by means of rollers or slides (not shown) that are trapped within and guided along the tracks 92. The rail assemblies 107 both support the forming assemblies 52 and provide them with guided movement around the radius edge 38a during the compaction process. The rail assemblies 107 are supported on and slidable along the beams 90, thereby allowing the longitudinal position of each group 105 of the forming assemblies 52 to be adjusted to suit the particular form block 38 being used. In the illustrated embodiment, the beams 90 are straight, however in other applications, the beams 90 may have one or more contours in order to adjust the position of the forming assemblies 52 to match curves or contours along the radius edge 38a.

It should be noted here that while in the illustrated embodiment, the forming assemblies 52 are supported by, and guided for movement along the fixed track assemblies 107, other devices and structures may be employed to translate and guide the forming assemblies 52 over the tool block 38, including around the radius edge 38a. For example, the forming assemblies 52 may be mounted on a gantry system (not shown), or on the end of one or more articulated arm, multi-axis robots (not shown) operated by a programmed controller such as a computer (not shown).

In use, one or more plies 30a that are either flat or pre-formed are loaded onto the form block 38 while it is in its loading position. Then, the form block 38 is moved along the track rails 88 (FIG. 12) into an operative position beneath the forming assemblies 52. With the forming assemblies 52 in their raised, starting position (shown in FIGS. 12-17), the forming assemblies 52 lower the roller assemblies 45, bringing the tube 42 into contact with the ply 30a. The forming assemblies 52 translate along the guide tracks 92 in the rail assemblies 107, causing the rolling former 40 to move around the contoured tool radius 38a, while the desired compaction force is applied to the tube 42 by the compaction cylinder is 106 throughout the range of motion of the forming assemblies 52. As the rolling former 40 translates around the radius edge 38a (see FIG. 4), the tube 42 rolls around and applies a desired compaction pressure to the ply 30a, forcing and compacting the latter against the tool block 38. When the rolling former 40 has translated over the entire ply 30a, the compaction cylinders 106 retract the rolling former 40 away from the ply 30a, and the forming assemblies 52 move along the guide tracks 92 back to their starting positions, in preparation for compacting the next ply 30a.

Figure 18:
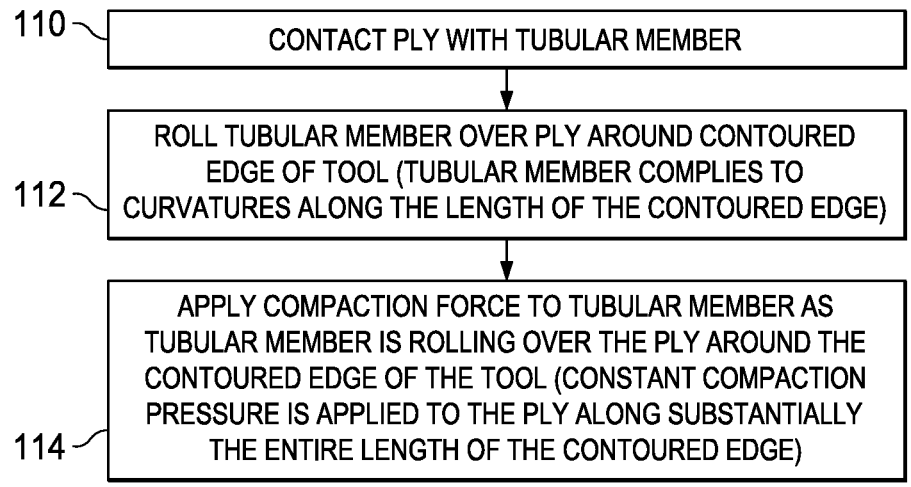
FIG. 18 is an illustration of a flow diagram of a method of compacting composite plies over contoured tool edges.

FIG. 18 broadly illustrates the overall steps of a one embodiment of a method of forming and/or compacting the composite ply 30a over a concave or convex radius edge as previously described. At 110, the ply 30a is initially contacted by a flexible, compliant rolling tubular member 42. At 112, the tubular member 42 is rolled around and over a contoured edge 38a of a tool 38, and the tubular member 42 complies to any curvatures along the length of the contoured edge 38a. At step 114, as the tubular member 42 is rolled over the contoured tool edge 38a, compaction pressure is applied to the tubular member 42. During this compaction process, substantially constant pressure is applied to the ply 30a along the entire length of the contoured edges 38a.

Figure 19:
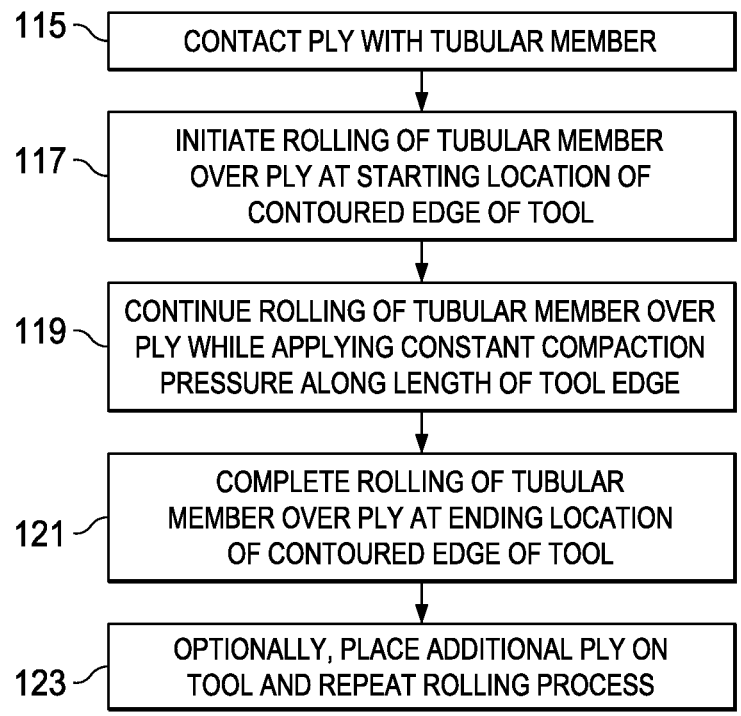
FIG. 19 is an illustration of a flow diagram of an alternate method of compacting composite plies over contoured tool edges.

Attention is now directed to FIG. 19 which broadly illustrates the overall steps of another embodiment of a method of forming and/or compacting a composite ply 30a over a concave or convex radius edge. Beginning at 115, a ply 30a is contacted by a tubular member 42. Then, at 117, rolling of the tubular member 42 is initiated over the ply 30a at a starting location of a contoured edge 38a of a tool 38. At 119, rolling the tubular member 42 is continued over the ply 30a while constant compaction pressure is being applied to the ply 30a along the length of the tool edge 38a. At 121, rolling of the tubular member 42 is completed over the ply 30a at an ending location of the contoured edge 38a of the tool 38, thereby completing compaction of the ply 38a on the tool 38. Optionally, as shown at 123, an additional ply 30a may be placed on the tool 38, and the rolling process described above is repeated.

Figure 20:
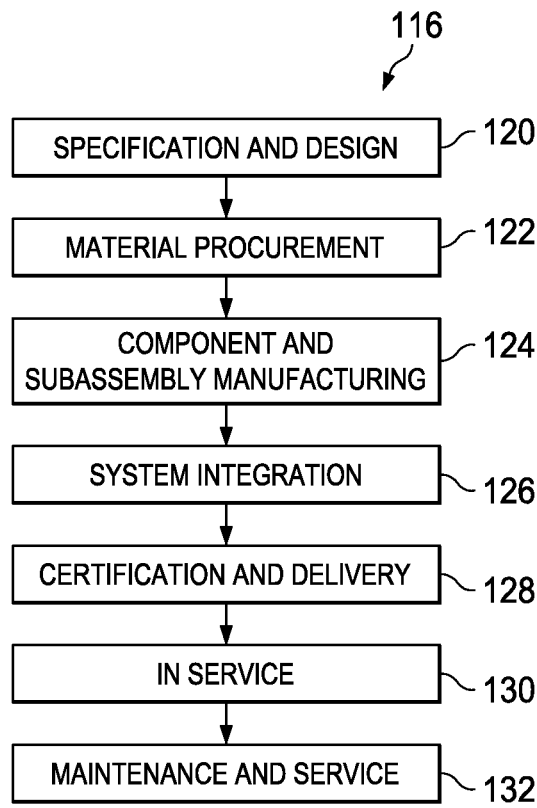
FIG. 20 is an illustration of a flow diagram of aircraft production and service methodology.
Figure 21:
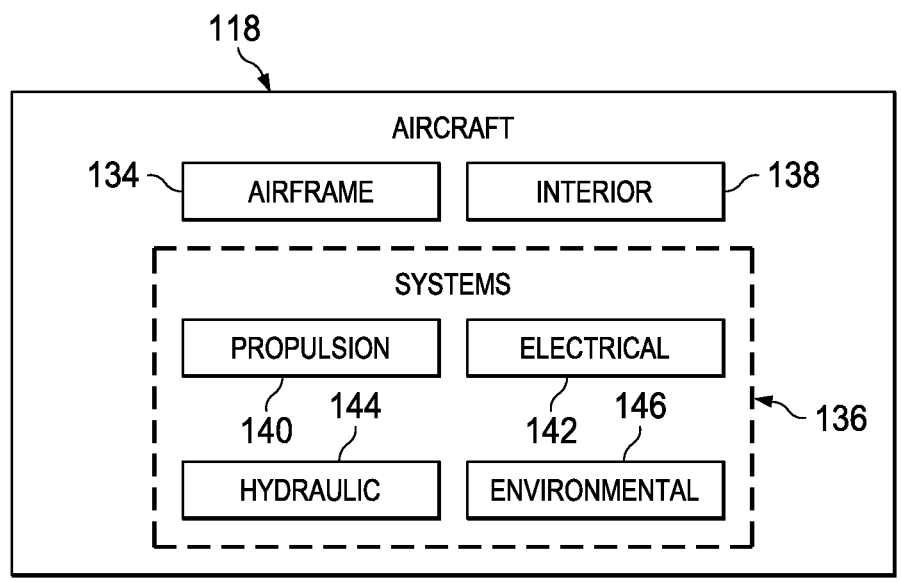
FIG. 21 is an illustration of a block diagram of an aircraft.

Embodiments of the disclosure may find use in a variety of potential applications, particularly in the transportation industry, including for example, aerospace, marine, automotive applications and other application where elongate stiffeners such as stringers, may be used. Thus, referring now to FIGS. 20 and 21, embodiments of the disclosure may be used in the context of an aircraft manufacturing and service method 116 as shown in FIG. 20 and an aircraft 118 as shown in FIG. 21. Aircraft applications of the disclosed embodiments may include, for example, without limitation, stringers, spars, beams and other structural stiffeners. During pre-production, exemplary method 116 may include specification and design 120 of the aircraft 118 and material procurement 122. During production, component and sub-assembly manufacturing 124 and system integration 126 of the aircraft 118 takes place. Thereafter, the aircraft 118 may go through certification and delivery 128 in order to be placed in service 130. While in service by a customer, the aircraft 118 is scheduled for routine maintenance and service 132, which may also include modification, reconfiguration, refurbishment, and so on.

Each of the processes of method 116 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 118 produced by exemplary method 116 may include an airframe and 134 with a plurality of systems 136 and an interior 138. Examples of high-level systems 136 include one or more of a propulsion system 140, an electrical system 142, a hydraulic system 144 and an environmental system 146. Any number of other systems may be included. Although an aerospace example is shown, the principles of the disclosure may be applied to other industries, such as the marine and automotive industries.

Systems and methods embodied herein may be employed during any one or more of the stages of the production and service method 116. For example, components or subassemblies corresponding to production process 124 may be fabricated or manufactured in a manner similar to components or subassemblies produced while the aircraft 118 is in service. Also, one or more apparatus embodiments, method embodiments, or a combination thereof may be utilized during the production stages 124 and 126, for example, by substantially expediting assembly of or reducing the cost of an aircraft 118. Similarly, one or more of apparatus embodiments, method embodiments, or a combination thereof may be utilized while the aircraft 118 is in service, for example and without limitation, to maintenance and service 132.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for compacting a composite ply over a tool, comprising:
    a tubular member capable of rolling over and applying compaction pressure to the ply; and
    a plurality of former assemblies located along the tubular member for the rolling the tubular member over the ply.

2. The apparatus of claim 1, wherein the tool has a contoured edge with a length and a curvature along its length, and:
    the tubular member is flexible and capable of complying to the curvature of the contoured edge.

3. The apparatus of claim 1, wherein each of the former assemblies includes:
    first and second roller assemblies arranged side-by-side along the tubular member, and the tubular member is rotatably held within each of the first and second roller assemblies.

4. The apparatus of claim 3, wherein each of the former assemblies further includes:
    a compaction cylinder coupled with the first and second roller assemblies for applying a compaction force to the tubular member.

5. The apparatus of claim 3, wherein each of the former assemblies includes a gimbal mounting arrangement pivotally mounting each of the first and second roller assemblies.

6. The apparatus of claim 5, wherein the gimbal mounting arrangement includes:
    a pivotable spreader rocker having first and second ends, and
    the first and second roller assemblies are respectively pivotally mounted on the first and second ends of the spreader rocker.

7. The apparatus of claim 1, wherein the former assemblies are pivotally connected with each other.

8. The apparatus of claim 1, further comprising:
    a plurality of rail assemblies including guide tracks for respectively guiding movement of the former assemblies,
    wherein the former assemblies are respectively mounted for guided movement along the guide tracks.

9. The apparatus of claim 8, further comprising:
    a pair of laterally spaced apart support beams, wherein the rail assemblies are spaced apart from each other and are mounted on the support beams.

10. The apparatus of claim 9, further comprising:
    a base slidably mounted on the support beams capable of supporting the tool.

11. Apparatus for compacting a composite ply on a compaction tool, comprising:
    a plurality of rollers;
    a roller holder for holding the rollers in spaced apart relationship to each other;
    a tubular member rotatably held between the rollers and capable of rolling over the ply; and
    a force applicator coupled with the roller holder for applying a compaction force to the tubular member.

12. The apparatus of claim 11, further comprising:
    a gimbal mounting arrangement for mounting the roller holder to pivot around first and second axes.

13. The apparatus of claim 11, wherein the force applicator includes a drive mechanism having a linearly displaceable rod coupled with the roller holder.

14. A method of compacting a composite ply on a tool, the method comprising:
    compacting the composite ply over the tool using an apparatus comprising: a tubular member capable of rolling over and applying compaction pressure to the ply; and a plurality of former assemblies located along the tubular member for the rolling the tubular member over the ply, wherein compacting further comprises:
    contacting the ply with the tubular member;
    rolling the tubular member over the ply; and
    applying a compaction force to the tubular member as the tubular member is rolling over the ply.

15. The method of claim 14, wherein rolling the tubular member includes:
    holding the tubular member within a set of rollers, wherein the set of rollers is part of the plurality of former assemblies; and
    rotating the tubular member within the set of rollers.

16. The method of claim 14, wherein applying a compaction force includes applying pressure to the tubular member at each of a plurality of locations along a length of the tubular member.

17. The method of claim 14, wherein the tool includes local contours, and rolling the tubular member includes flexing the tubular member along its length to conform to the local contours of the tool.

18. The method of claim 14, wherein the tool includes a contoured edge and rolling the tubular member includes rolling the tubular member over and around the contoured edge of the tool substantially throughout a length of the tubular member.

19. The method of claim 18, wherein rolling the tubular member includes:
   contacting the tubular member with a set of rollers, wherein the set of rollers is part of the plurality of former assemblies;
   rotating the tubular member within the set of rollers, and rotating the set of rollers around the contoured edge.

20. The method of claim 18, wherein the contoured edge has a length and is curved along its length, and the method further comprises:
   applying the tubular member to the contoured edge substantially throughout an entire length of the contoured edge.

\* \* \* \* \*

UNITED STATES PATENT AND TRADEMARK OFFICE
CERTIFICATE OF CORRECTION

PATENT NO. : 9,889,610 B2
APPLICATION NO. : 14/446082
DATED : February 13, 2018
INVENTOR(S) : DesJardien et al.

It is certified that error appears in the above-identified patent and that said Letters Patent is hereby corrected as shown below:

In the Specification

Column 1, Line 16, change "used the aircraft industry" to --used in the aircraft industry--
Column 4, Line 9, correct "a flat blade" to --a flat blade 34--
Column 4, Lines 28-29, change "radius edge 36a" to --radius edge 38a--
Column 4, Line 29, change "tool 38" to --tool block 38--
Column 4, Line 42, change "radius edge 36a" to --radius edge 38a--
Column 5, Line 5, change "the plies 30a" to --the ply 30a--
Column 5, Line 67, change "tool 38" to --tool block 38--
Column 6, Line 17, change "tool 38" to --tool block 38--
Column 6, Line 25, change "tool 38" to --tool block 38--
Column 6, Line 66, change "form block 38" to --tool block 38--
Column 6, Line 66, change "form block 38" to --tool block 38--
Column 7, Line 4, change "form block 38" to --tool block 38--
Column 7, Line 7, change "form block 38" to --tool block 38--
Column 7, Line 37, change "form block 38" to --tool block 38--
Column 7, Line 53, change "form block 38" to --tool block 38--
Column 7, Line 54, change "form block 38" to --tool block 38--
Column 8, Line 14, change "tool 38" to --tool block 38--
Column 8, Line 28, change "tool 38" to --tool block 38--
Column 8, Line 34, change "tool 38" to --tool block 38--
Column 8, Line 35, change "tool 38" to --tool block 38--
Column 8, Line 36, change "tool 38" to --tool block 38--
Column 9, Line 2, change "an airframe and 134" to --an airframe 134 and--

Signed and Sealed this
Eighteenth Day of June, 2019

Andrei Iancu
*Director of the United States Patent and Trademark Office*